US007890576B2

(12) United States Patent
Button et al.

(10) Patent No.: US 7,890,576 B2
(45) Date of Patent: Feb. 15, 2011

(54) SELECTIVE COMMUNICATION OF TARGETED INFORMATION

(75) Inventors: Thomas L. Button, Woodinville, WA (US); James Robert Hamilton, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 317 days.

(21) Appl. No.: 11/598,478

(22) Filed: Nov. 13, 2006

(65) Prior Publication Data

US 2008/0114829 A1    May 15, 2008

(51) Int. Cl.
G06F 15/16    (2006.01)

(52) U.S. Cl. .................. 709/203; 709/217; 709/218; 709/219

(58) Field of Classification Search .......... 709/217–219
See application file for complete search history.

(56) References Cited

U.S. PATENT DOCUMENTS

| | | | |
|---|---|---|---|
| 5,900,825 A | 5/1999 | Pressel et al. | |
| 6,510,207 B1 | 1/2003 | Cannon et al. | |
| 6,512,930 B2 | 1/2003 | Sandegren | |
| 6,519,530 B2 * | 2/2003 | Crockett et al. | 701/300 |
| 6,628,938 B1 * | 9/2003 | Rachabathuni et al. | 455/456.3 |
| 6,654,689 B1 * | 11/2003 | Kelly et al. | 702/3 |
| 6,750,813 B2 * | 6/2004 | Vargas-Hurlston et al. | 342/357.09 |
| 6,763,371 B1 * | 7/2004 | Jandel | 709/204 |
| 6,816,735 B1 | 11/2004 | Rayburn et al. | |
| 6,944,679 B2 | 9/2005 | Parupudi et al. | |
| 6,996,579 B2 * | 2/2006 | Leung et al. | 707/104.1 |
| 7,120,662 B2 * | 10/2006 | Vange et al. | 709/203 |
| 7,200,394 B2 * | 4/2007 | Aoki et al. | 455/435.1 |
| 7,330,720 B2 * | 2/2008 | Hinz | 455/422.1 |
| 7,463,890 B2 * | 12/2008 | Herz et al. | 455/445 |
| 7,489,774 B2 * | 2/2009 | Agrawal et al. | 379/211.02 |
| 7,689,510 B2 * | 3/2010 | Lamkin et al. | 709/217 |
| 2001/0049275 A1 | 12/2001 | Pierry et al. | |
| 2002/0116271 A1 * | 8/2002 | Mankoff | 705/14 |
| 2004/0036622 A1 | 2/2004 | Dukach et al. | |
| 2004/0203611 A1 | 10/2004 | Laporta et al. | |

(Continued)

OTHER PUBLICATIONS

Cheverst et al., "Experiences of developing and deploying a context-aware tourist guide: the Guide project", Date: 2000, pp. 20-31, ACM Press, New York, US, http://delivery.acm.org/10.1145/350000/345916/p20-cheverst.pdf?key1=345916&key2=3960226511&,coll=portal&dl=ACM&CFID=3256630&,CFTOKEN=88690959.

(Continued)

Primary Examiner—Kevin Bates
Assistant Examiner—Minh-Chau Nguyen (57) ABSTRACT

Described is a technology by which by which information (an electronic note from a producer) that is available for delivery to a client consumer is only selectively delivered. The selective delivery may be based on metadata associated with the information, client identity data and other criteria, including a location of a client device. The information to selectively deliver may be obtained from an external information source, or generated by a service, such as when the user is near a location of interest. The client may report location changes, such as a rate corresponding to a rate of location change of the client. An information service scale to any practical number of clients via client state servers and location (of interest) servers, with each client state server associated with a set of one or more clients, and each location server associated with a set of one or more regions.

5 Claims, 6 Drawing Sheets

U.S. PATENT DOCUMENTS

| | | | |
|---|---|---|---|
| 2004/0243452 A1* | 12/2004 | Barton et al. | 705/7 |
| 2005/0015307 A1 | 1/2005 | Simpson et al. | |
| 2005/0228707 A1* | 10/2005 | Hendrickson | 705/8 |
| 2005/0277428 A1 | 12/2005 | Nathan Brown | |
| 2006/0063517 A1* | 3/2006 | Oh et al. | 455/415 |
| 2006/0068808 A1 | 3/2006 | Karavias | |
| 2006/0073810 A1* | 4/2006 | Pyhalammi et al. | 455/407 |
| 2006/0168204 A1* | 7/2006 | Appelman et al. | 709/224 |
| 2006/0184886 A1* | 8/2006 | Chung et al. | 715/758 |
| 2006/0218191 A1* | 9/2006 | Gopalakrishnan | 707/104.1 |
| 2007/0078711 A1* | 4/2007 | Anand | 705/14 |
| 2007/0225017 A1* | 9/2007 | Li et al. | 455/456.1 |
| 2008/0016144 A1* | 1/2008 | Hyun et al. | 709/203 |
| 2008/0025307 A1* | 1/2008 | Preiss et al. | 370/392 |
| 2008/0076447 A1* | 3/2008 | Duxbury et al. | 455/456.1 |

OTHER PUBLICATIONS

Ludford et al., "Because I carry my cell phone anyway: functional location-based reminder applications", Date: 2006, pp. 889-898, ACM Press, New York, US, http://delivery.acm.org/10.1145/1130000/1124903/p889-ludford.pdf?key1=1124903&.key2=8899-126511&coll=portal&dl=ACM&CFID=3256630&CFTOKEN=88690959.

Marmasse et al., "Location-aware information delivery with commotion", Date: 2000, pp. 157-171, http://alumni.media.mit.edu/~nmarmas/cmHUC2k.pdf.

Sawhney et al., "Nomadic radio: speech and audio interaction for contextual messaging in nomadic environments", Date: Sep. 2000, pp. 353-383, vol. 7, Issue 3, ACM.

* cited by examiner

SELECTIVE COMMUNICATION OF TARGETED INFORMATION

BACKGROUND

With few exceptions, contemporary modes of communication modes are primarily fully synchronous or fully asynchronous. Synchronous modes include voice conversations, face-to-face communication, phone calls or instant message communication between persons who are authenticated and present on a network. Fully asynchronous modes include leaving a voice or electronic (e.g., text) message or the like to be picked up at the convenience of the recipient. Fully asynchronous modes also include broadcast communications such as via websites, traditional broadcast advertising or road signs, which are not targeted at any one person in particular.

Because synchronous communication requires at least two available and willing participants, synchronous communication is not always possible or desirable. Alternatively, asynchronous communication is often irrelevant, distracting and/or of little value. However at times, asynchronous communication does deliver desirable and valuable information from the sender to the recipient. The times at which valuable information is asynchronously provided are very unpredictable, however, and thus such communications often do not reach the recipient when the recipient could best use the information or would like to receive it.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which information that is available for delivery to a client consumer is only selectively delivered. The selective delivery or non-delivery (or deferred delivery) may be based on metadata associated with the information, client identity data and one or more criteria, including data corresponding to a location of a client device. The information to selectively deliver may be obtained from a producer, comprising an external information source or a service, such as when the user is near a location of interest. The location may be an actual device location (e.g., coordinates) or a logical location (e.g., actual location plus predicted location based on speed, direction and so forth). The client may report location changes, such as a rate corresponding to a rate of location change of the client.

In one example networked communications environment, a system may provide a plurality of client state servers and location servers, with each client state server associated with a set of one or more clients, and each location server associated with a set of one or more regions. Note that this is only one example of how a service may be implemented; for example, client identity and location can be hashed and mapped to one server, for example, rather than having separate client and location servers.

The client couples to the service, e.g., a router may couple an identity-based client for communication with a selected client state server associated with that client. A selection mechanism associated with the service evaluates client-associated state data against metadata of information (e.g., an electronic note) generated by a producer (e.g., the service or external source such as another client) to determine whether to deliver the note to the client based on client identity data, such as a user identifier and/or a device identifier.

Thus, upon obtaining information for potentially sending to a set of one or more clients, the clients may be selected as consumers based on client identity data. For example, a sender/producer may specify one or more clients for possible delivery. For each possible consumer, the information may be delivered based on an evaluation of metadata associated with the information against client state data of the selected client, including client device location data and client context data. The information is only delivered to the selected client (e.g., pushed or pulled) when the metadata meets requirements set forth in the client state data of that selected client.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards selective communication of information to one or more targeted recipients, referred to as consumers, based upon information (metadata) accompanying the information, the identity of each consumer (which may include group affiliation), and based upon other delivery criteria, such as on a specific time, location and/or context. In general, because of the time, location and/or context-based selectivity, the delivered information typically has more relevance to a consumer that meets the criteria, while also causing less undesirable distraction by not delivering to those consumers who do not. As a result, the selective communication is far more likely to accomplish at least one goal of the sender, including delivering desirable, valuable information at a time when it is likely the most useful to each receiving consumer.

In one example implementation, selective communication of information can be considered as leaving an electronic note (message) for a consumer. However, unlike a conventional note, the communication is selective, and may or may not be delivered depending on various criteria. Further, an electronic note can expire without being processed by the consumer, such as if the time, place and/or context are no longer relevant for that note, e.g., the intended consumer has not read (or heard) the note within a relevant time, is no longer near a location, and/or the context no longer applies. The note can be discarded, or alternatively can be queued for possible later delivery when the delivery criteria are met, e.g., the received information may be cached at the sender (or at the recipient) for an indefinite time.

It should be noted that the technology described herein is independent of any particular form of delivery, content and/or how the recipient obtains the information, e.g., visually by text, graphics and/or video, by listening to audible content, and/or by tactile feedback. As such, any means of communication may be used, and any visible, audible and/or tactile feedback may be used to selectively communicate information. Thus, as used herein, "note" or "electronic note" is not limited to any particular form, format or the like.

Moreover, much of the description is directed towards an example implementation in which each client reports its location, such as by reporting current GPS coordinates, and in which filtering of notes for selective delivery is performed by servers of the note delivery service. However, as can be readily appreciated, the client location can be determined without necessarily having the client directly report its location, such as by cellular phone triangulation, proximity detection, and so forth. Further, the client may perform at least some of the filtering, e.g., a client device can be in different receiving modes.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and/or communication in general.

Figure 1:
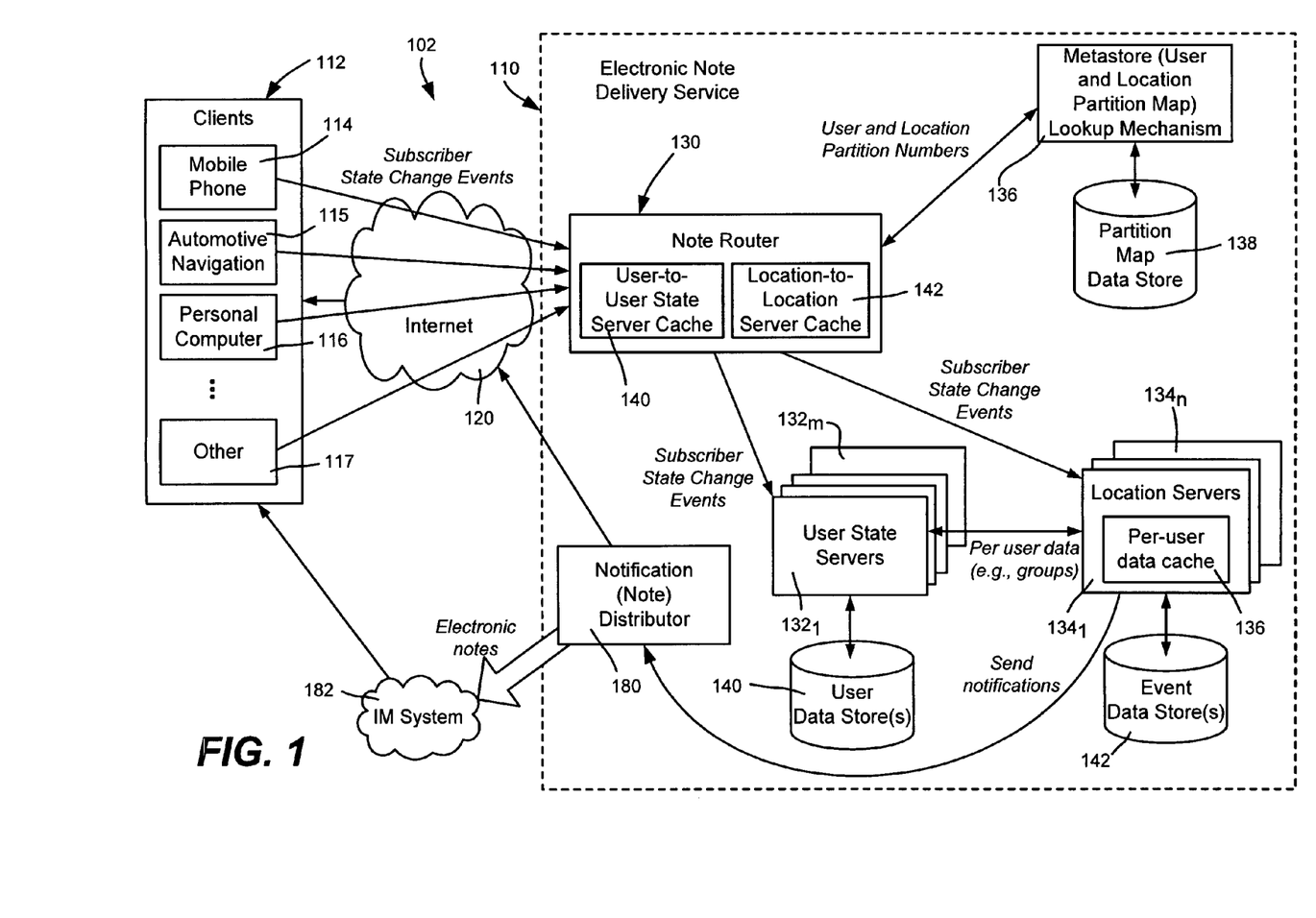
FIG. 1 is a block diagram representing an example architecture for providing subscriber state change events from clients to an electronic note delivery service that selectively delivers electronic notes to clients.

Turning to FIG. 1 of the drawings, there is shown an example architecture 102 for selectively delivering electronic notes from an electronic note delivery service 110 to clients 112 based on each client's identity, and also upon time, location, and/or context. As used herein, the terms "location" (or place), "time" or context are non-limiting. For example, location may refer to a client's current location, but also may include logical location such as southbound on Interstate 405 and the like such as based upon current location, speed and direction, and/or historical or statistical location predictions. Time generally refers to the current time, however other concepts of time are applicable, e.g., twelve hours since the last note was sent, and so forth.

Context may be any state information, whether provided by the user or derived from existing data, statistical data, historical data and/or the like. For example, a user can set a context such that the service will only deliver emergency-priority notes when the client has entered a do-not-disturb state, only deliver a price list for purchasing gasoline when the gasoline tank in the client's vehicle is below some threshold limit, and so forth. Essentially any data can be used for context matching, e.g., do not deliver a note about an upcoming restaurant's lunch special when the user's calendar data indicates the user is on the way to a meeting and the estimated time of arrival does not provide adequate time to stop for lunch. Detecting multiple presence is another possible context, in which multiple users are logged in and detected at the same location. For example, multiple logged-in users in the same vehicle are detectable as being together by their matching location data that is received as updates are sent. Targeted notes may be sent to one or more those users based on their multiple presence context.

Each of the clients 112 has an identity that may be user, group or a device identity, or some combination thereof. For example, the same user may have one client identity corresponding to a cell phone, and another client identity corresponding to an automotive navigation system in that user's car. In one example, the client identity is comprised of a user identifier and a device identifier.

Essentially, any device having communication capabilities may act as a client device. As shown in FIG. 1, non-limiting examples of client devices 114-117 include a mobile phone 114, an automotive navigation system 115, a personal computer 116 (which may be a desktop, laptop, tablet, hand-held, palm-sized device, and so forth) acting as client devices. One or more other devices 117 such as a personal digital assistant, GPS unit, Smartphone, radio, audio players, satellite receiver, SPOT (Smart Personal Object Technology) devices and so forth may act as client devices.

In one example implementation, each device participating in the electronic note service has access to the Internet 120; note that in alternative implementations, a private network service may be used, but for purposes of description herein the Internet 120 will be used as an example communication means. Client access may be via the cellular system, via wireless internet connectivity (e.g. 802.11), by satellite, or by any other practical means of connecting a device to the Internet 120. The means of connecting is immaterial, although as is understood some sort of connectivity is needed to enable device participation. Also shown in FIG. 1 is a notification distributor 80 for sending electronic notes to recipients, e.g., via the public instant messaging system 182 or the like. For example, notes may be delivered in other ways, e.g., to a "notes" website associated with a user, by an automated phone call, by audio broadcast over the user's audio system, and so forth.

Figure 2:
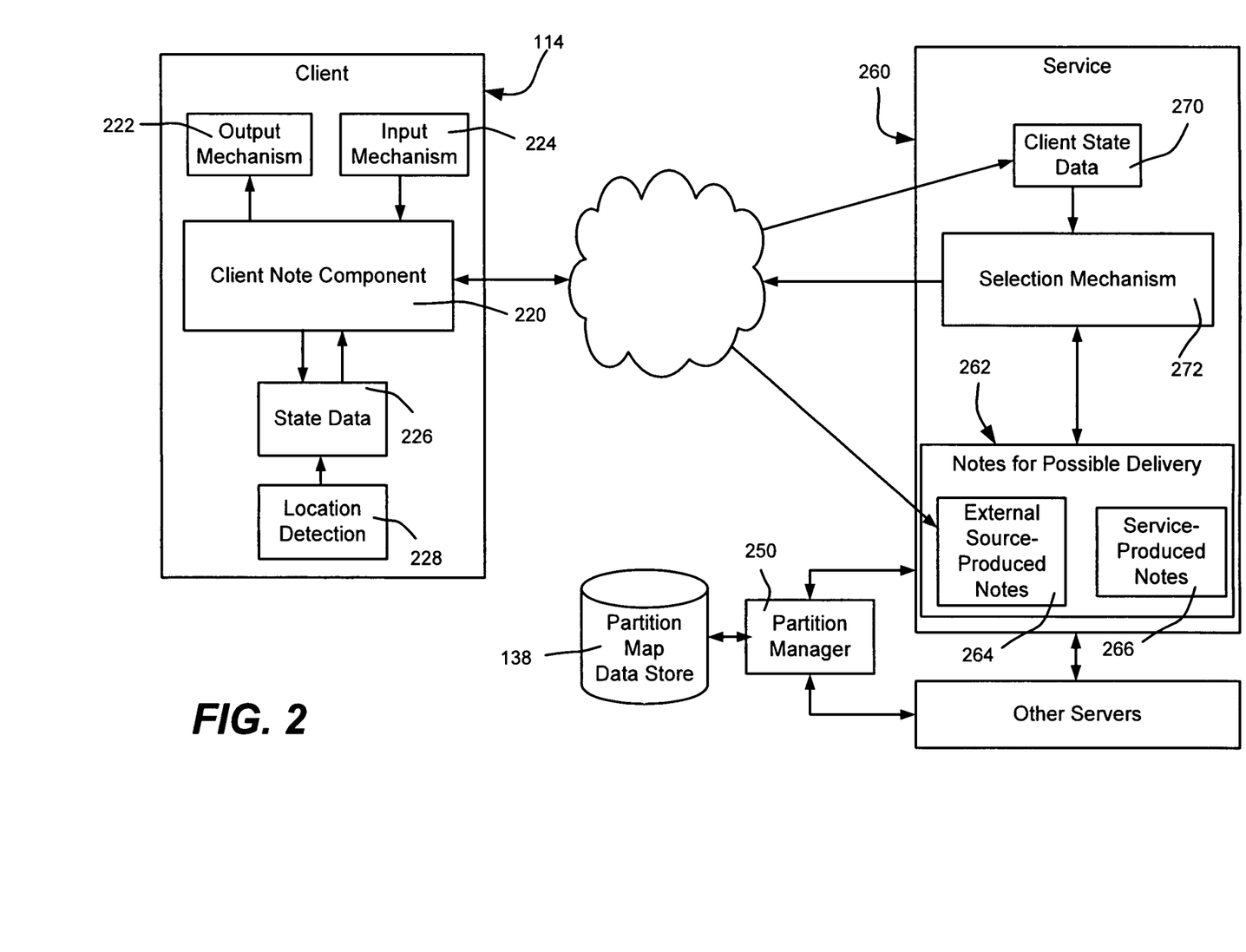
FIG. 2 is a block diagram representing example components in a client and service that selectively delivers electronic notes to clients.

As represented in FIG. 2, an example implementation comprises a client-side note component 220 at each client (e.g., the client 114 of FIG. 1). The note component 220 generally comprises a program or other logic suitable for running on that type of client device. In general, the client note component 220 is coupled to an output mechanism 222 such as a display and/or speaker for outputting received notes, and an input mechanism 224 for receiving user input, such as current user preferences and other user-specific information related to notes. Speech to text and/or text to speech concepts may be provided in the input and output mechanisms 222 and 224, or elsewhere in the client. Further, the input and output mechanisms 222 and 224 can be used for other, non-note-related purposes specific to the device, e.g., to place a mobile phone call.

In general and as described below, the client note component 220 receives notes, and also communicates state data 270 to a relevant server (e.g., 260 as determined by the router). Notes can be pushed to the client device 114, or pulled from the server 260 on demand, or some combination thereof, e.g., urgent notes may be pushed while non-urgent notes may be pulled. Notes may be cached at the client 114, and may automatically expire based on user state and/or preferences and/or accompanying note metadata, and may be cleared from the cache or automatically uploaded to another storage based on priority, space limitations, and so forth.

The client note component 220 also acts on state data 226, such as to report the device's current location. In the example of FIG. 2, a location detection component 228 (such as a GPS device) is shown in the client device 114, although as described above location detection can be accomplished by other means.

Returning to FIG. 1, the example architecture 102 also includes the electronic note delivery service 110 that provides selective note delivery to participating clients. As can be readily appreciated, any business model may be employed for supporting such a service, however any particular business model is outside the scope of the present description, except to note that it is likely that such a service will be an advertising-funded, subscription-based, correspond to a one-time purchase, and/or be bundled with a device; many other business models are possible.

The service 110 includes at least one data store, such as database with schemas for subscribers (people) that includes identity (uniquely authenticated on the network), place (current location, e.g., GPS coordinates resolvable to logical location, e.g., eastbound on Highway One at 148th Avenue), and other user context information. Such other context information may include a "Do Not Disturb" status flag with values such as do not disturb for any reason, do not disturb unless a public emergency is announced, do not disturb unless subscribed content is available, do not disturb unless a note is from an immediate family member, and so forth. Optionally, context from a user's navigation system and/or calendar may be stored, e.g., a known location that is resolvable to context useful for notes, such as the expected time of arrival relative to the start of a user's next calendar appointment.

As represented in FIG. 1, each participating client device 114-117 periodically (or on some other schedule) sends state change update events, which typically includes sending a location update packet to the electronic note delivery service 110. In one example implementation, the frequency of sending these state change update events may be a function of user configuration input, service provider decision, and/or other criteria, such as the speed at which the client device is currently moving. For example, to reduce unnecessary location update packet communication, stationary devices may send updates only relatively rarely, such as once per hour. Devices that are currently in rapid motion may send updates far more frequently, which at highway speeds for example, may be on the order of once every one or two seconds. Devices at lesser speeds may send more frequent updates than stationary devices, but not as often as devices at high-speed movement. Further, service providers may decide on update frequency to an extent, e.g., those wishing to offer a very high quality service might support very frequent updates (e.g., at least to premium participants), whereas those more concerned with minimizing costs might designate that updates be sent less frequently. Users wishing to have very accurate and very timely data may request more frequent updates, whereas those concerned with things such as battery life or data transfer charges might request less frequent updates. Other criteria may also be used, e.g., a low battery state may automatically lower the frequency.

In one example implementation, a state change update is sent via the Internet 120 to a note router 130 (there may be multiple routers, however only one is shown for simplicity) of the electronic note delivery service 110. The note router 130 may be a stateless router, coupled to one or more user state servers $132_1$-$132_m$ and location servers $134_1$-$134_n$. In general, the note router 130 access a metastore lookup mechanism 136, coupled to a partition mapping data store 138, to determine which server or user state server and location state servers (corresponding to locations of interest) apply for a given user and location. As described below, users and locations may be mapped to partitions, whereby servers can share loads, primarily for purposes of scalability.

In one example implementation, the user state server (e.g., $132_1$) stores the current locations for that subset of users for which it is responsible. Note that for each given user, each user's device location is tracked independently, since there is no need for every device owned by a given user to always be in the same location. To this end, a user may have one or more location records (or other data structures), e.g., one for each registered device.

Subscriber state change events are also sent by the router to the appropriate location server, e.g., $134_1$. In general, the location servers track locations designated "of interest" to a particular user or set of users, as described below. For example, in one implementation, each region covered by the service is divided up into rectangular sub-regions, with those rectangular sub-regions managed by a single location server (which may comprise more than one physical machine). Thus, locations of interest have an area over which they apply. Each note is stored on every location server that is responsible for all or parts of the sub-region over which a given location of interest applies. In other words, a given note may be stored on more than one location server if that note applies to more than one area of the partitioned location server coverage area.

For efficiency (e.g., in reducing lookups), the note router 130 may include caches such as a user-to-state server cache 140 and a location-to-location server cache 142. For example, the note router 130 may load the user partition map and the location partition map, or some subset thereof. These lookup maps may comprise lookup tables, for example, that when given a user identity, provides the single user state server (e.g., $132_1$) in the user state server cluster (e.g., $132_1$-$132_m$) responsible for that particular user's state, and given the location of a user, finds which single location server (e.g., $134_m$) in the location server cluster (e.g., $134_1$-$134_n$) manages the region that includes that user's current location.

In turn, the user state servers and location servers $132_1$-$132_m$ and location servers $134_1$-$134_n$ access respective data stores 140, 142 to update the stores as state change events are received. In this manner, various information including current user/client state information is known to the service 110 as change events are received by the note router 130. As described above, there may be many change events depending upon the traffic demands of the current user base.

By way of example of a state change update, the state change update may be in the form of a location update packet, including some or all of the following example data:

| | |
|---|---|
| User Identity | Identity of user |
| Device Identity | Identity of device that is sending this location update. |
| Location | Location in Latitude and longitude format |
| Logical location | Logical location that will be null when not known or not distinguished but, when additional location data is of interest, is tracked here. The location field above is included as an absolute, physical location, whereas logical location is additional location-based data, such as southbound on Highway One. |
| Speed | Current device speed, e.g. in miles per hour or kilometers per hour. |
| Direction | Current device direction of movement in compass degrees true. |
| Calendar State | Do not disturb flag: Has user requested no interruptions? Next meeting Time: UTC time of next meeting. Work/non-work flag: Is user currently working or not? |

Figure 3:
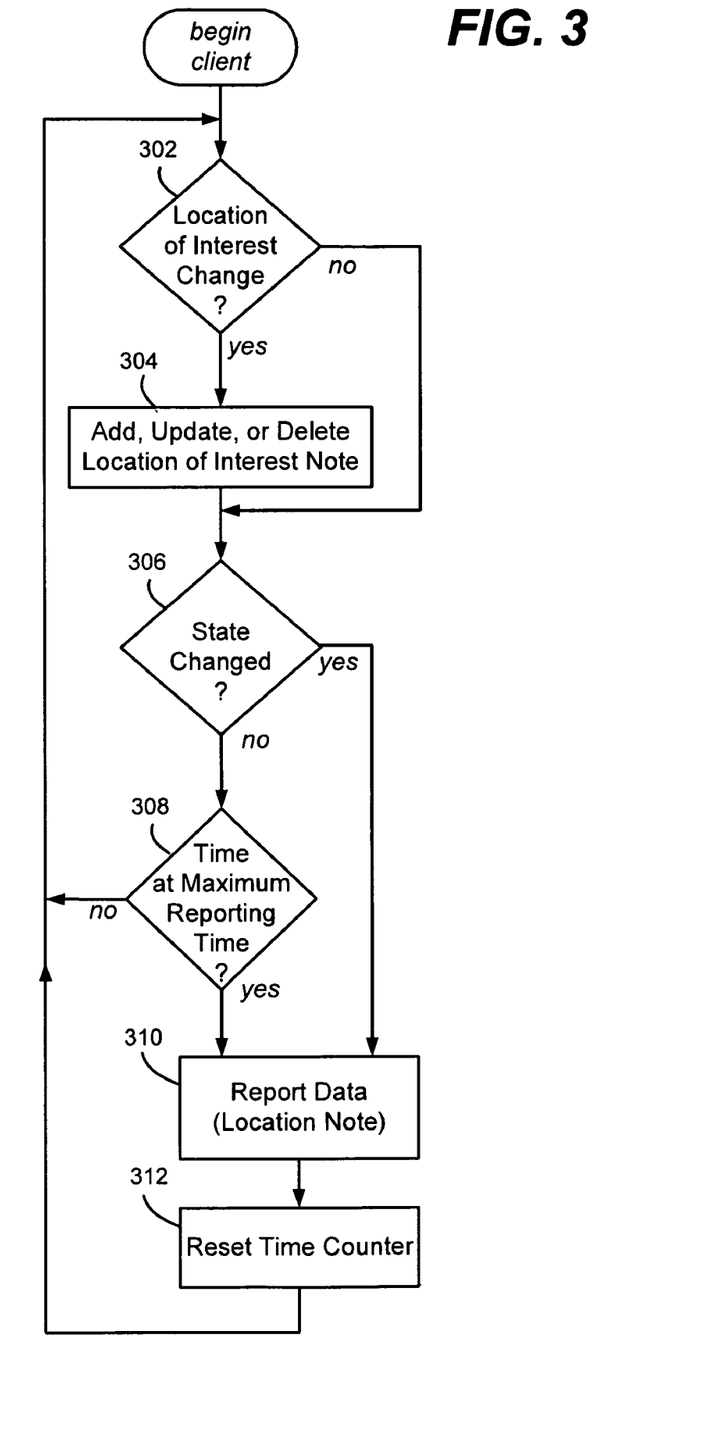
FIG. 3 is a flow diagram representing example client logic for providing subscriber state change events and location note updates to an electronic note delivery service.

FIG. 3 shows example steps that may be taken at the client note component 220 to update information at the user and location servers. The process may begin when the hosting device is powered on, or on some other event, such as user or timer activation. Note that steps 302 and 304 are directed towards submitting a location of interest change to the servers, as described below with reference to FIG. 4, but shown herein for completeness.

Step 306 evaluates whether the client's state has changed. This may be a location change, a user-initiated change (e.g., switching to do-not-disturb), a time- or calendar-initiated change, and so forth. Note that with respect to a location change, there may be some threshold amount of change before it is considered sufficient movement to update, e.g., a user pacing back and forth while on a cell-phone call may be considered stationary. Note that this also correlates with update frequency corresponding to the user's rate of movement, e.g., a coordinate change corresponding to some threshold of movement (e.g., fifty-feet) will result in more frequent updates when driving at sixty miles per hour than when walking at five miles per hour. Note that although not shown in FIG. 3, there may be a limit placed on how frequently an update is sent, e.g., once per second is the maximum update rate even if state changes are detected more frequently.

If a state change is detected at step 306, the data is reported to the server at step 310, e.g., via the above-exemplified subscriber location update packet. Note that if no state change is detected, a timer or the like may be used to send an update. For example, an update may be sent once per hour regardless of there having been no state change. Step 308 shows such time-based reporting when a maximum time is reached, with step 312 resetting the time counter after the update is sent. Note that the maximum time may be user configurable and/or configured by the service. In this manner, user state is reported upon a state change, or time event that sends a subscriber location update packet.

When the note router 130 receives a subscriber location update packet, the note router 130 looks up which user state server stores that user's data and forwards the packet to that user state server. Each update received from a subscriber device replaces the location, speed, and direction data previously stored for that subscriber device. As a result, the user state servers $132_1$-$132_m$ always have the most recent location, speed, and direction as provided by their respective users. No other actions may be needed at the user state server when processing subscriber state change events.

The note router 130 also looks up which location server is responsible for the location at which the subscriber device currently is located and also forwards the subscriber location update packet to that location server. Thus, one server (e.g., $132_1$) in the user server cluster and one server (e.g., $132_n$) in the location server cluster receives a copy of the location update packet, (although "one server" includes concepts such as replicas and the like that may be used to ensure reliability).

Figure 4:
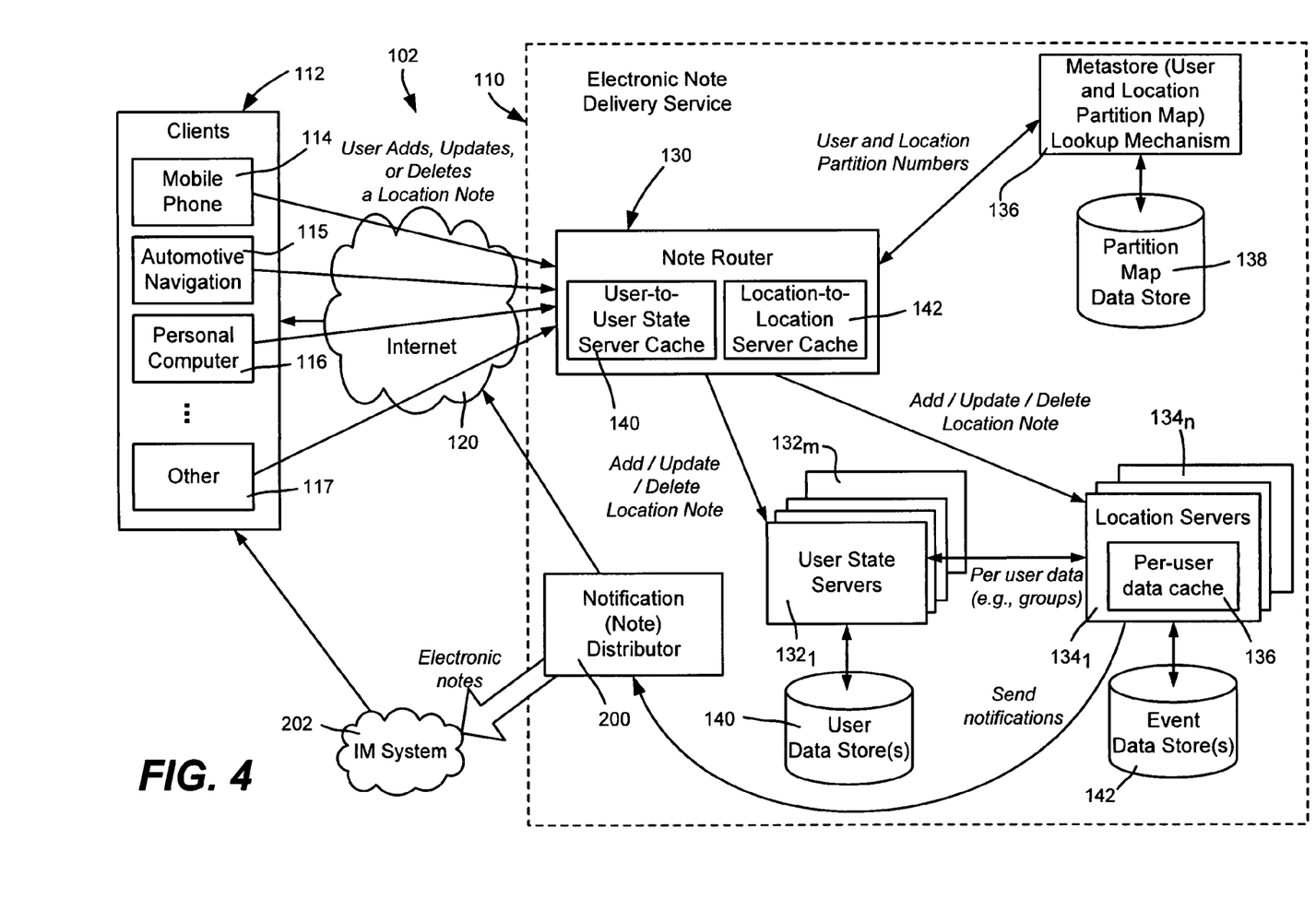
FIG. 4 is a block diagram representing an example architecture for adding, updating or deleting location-of-interest information of an electronic note delivery service that selectively delivers electronic notes to clients.

Turning to another aspect, exemplified in FIG. 4, the internet-scale service provides notes to a community of contributing users, with each user able to define up to a relatively large number of locations of interest. Locations of interest are the locations expected by some user of the system to be of interest to one or more members of the user base (although it may only be of interest to the user that submitted it). In general, locations of interest apply to a subset of users that are in a region in which the location of interest corresponds, with the subset of users also filtered by other constraints, such as time and group membership.

To control the number and types submitted, when contributing a location of interest, several conditions may need to be met, such as that the contributor needs to be an authenticated user of the service, and has the authorization to add a location of interest at the requested scope. For example, adding locations of interest at broader scopes may require greater privilege, as may adding commercial locations of interest. Other restrictions may be set by per-user, per-group, or global system policy.

As described above, the service tracks each user, and among other notes, may send notes that inform the users of things that are potentially interesting to them (locations of interest) on the basis of where they are, the time, and/or their personal context. Note that the service tracks the locations of users' registered devices, not the actual user. As a result, more than one of a user's devices may be in motion at the same time, e.g., a phone device may be lent to a friend. This raises no technical problems for the service implementation, and as a side benefit, allows tracking of a lost or stolen device.

As a user enters a location of interest into the system, the web server handling the requests will request information from the user state server that stores that particular user's data. This information includes user authorization data, group membership and so forth required to validate this particular location of interest submission from this particular user. If the location of interest is acceptable, it is routed by the web service to the appropriate location server or servers and to the appropriate user state server.

As with location state change events, location of interest changes may come into the server over the public Internet. Location change requests may come in via HTTP interactions with web servers hosted by the service, for example, rather than being in an application-specific communication protocol. To allow local client support and to support off-line operation, the service also supports web service (REST or WS-*) requests.

As represented in FIG. 4, each user may add, delete or update location of interest data by sending location of interest changes (e.g., as notes) to their respective user and location servers. Note that such location of interest changes tend to occur far less frequently than location changes but still scale with the number of users.

Location of interest updates are routed to the correct location server using a similar technique to that described above with respect to location change event processing. The partition maps 138 for both user state servers $132_1$-$132_m$ and location servers $134_1$-$134_n$ are loaded into the note router 130 (or each note router in a multiple-router system). Each location of interest that comes into the service 110 is directed to the appropriate location server (or servers) and to the appropriate user state server. Recall that subscriber state change events are also sent by the note router 130 to both the appropriate location server and to the appropriate user state server.

Each location of interest is directed by the router to each location server in the location server cluster $134_1$-$134_m$ that covers a region possible impacted by that location of interest. This allows a single server to handle the processing of local-only locations of interest, and therefore can scale to very large numbers of locations of interest. For global locations of interest with very broad scope and potentially a very large number of users that may need to be notified, global locations of interest may be redundantly stored on more than one server in the location server cluster, allowing efficient scaling to very large numbers of users. As described below, hardware (e.g., Virtual IP) or software load balancing may be employed for scaling purposes.

Thus, location servers contain the locations of interest, each covering a specific region corresponding to the region over which a user may be notified if in that region. If the applicable region is relatively small, then it may be stored on a single location server, whereas if the region is relatively large, many location servers may be involved. A validated location of interest is sent to any location server that supports some part of the region that may be impacted by this location of interest, e.g., a web server sends the new or updated location of interest to each location server and the operation is complete when they are all acknowledged.

Location of interest changes are also sent to all user state servers, since any user may be in the affected region. Thus, a query is run on each. Note that the service does not wait for the next location change event to trigger a notification, because a given user may not be moving, and, when not moving, location change events may be sent infrequently. The user state servers are used to track the current user position and resolve this query, as well as to track other information such as billing information, group membership and any other user-specific information stored by the servers.

In one example implementation, to scale to large numbers of locations of interest, the regions covered by the service may be partitioned into sub-regions, with sub-regions assigned to individual servers. The partitioning of users and/or locations may change over time as needed to balance system load changes.

To scale to a large number of users, the user base is partitioned (e.g., by a partition manager 250, FIG. 2) such that contiguous groups are assigned to servers in a state server cluster. The number of systems in the clusters is adjusted to handle growth or contraction of the user base. Statistical and other (e.g., historical) information may be used to partition certain users together, e.g., a set of users that move often and thus send updates frequently may be in the same partition with users who rarely move, thereby averaging out how often the server handles location change updates. Similarly, premium and non-premium subscribers can be combined, as can users who tend to use the service at night with those who tend to use it during the day.

The partition mapping for user state servers is along a single dimension, whereby conventional techniques can be used to divide up the user space into partitions stored one partition to each server. However, data and workload skew invariably will require rebalancing and repartitioning. To facilitate dynamic rebalancing, one example service uses a technique that partitions the user space into mini-partitions, in which there are far more (e.g., 100 to 1000 times) more mini-partitions than user state servers. This grows the size of the partition maps 138 to an extent, in that there are many more entries than if the service had used a single partition per server in the cluster, however the mini-partitions need never be changed for dynamic balancing purposes. Instead, as the load gets asymmetrically high on one system in the user state server cluster, entire mini-partitions may be moved to less heavily loaded servers (or new servers) in their entirety. By moving atomic partitions rather than having to repartition for dynamic load balancing, more efficient rebalancing is provided, and also allows very small amounts of data (e.g., a single mini-partition) to be brought off-line for system maintenance.

The service 110 uses a similar technique for the partitioning the location servers of the location server cluster $134_1$-$134_n$. Note that unlike users, the area covered managed by a server is a two-dimensional region. Further, note that typically there are many more locations of interest in densely populated regions than there are in lightly populated areas. To deal with the large data skew between lightly loaded regions and heavily loaded regions, the service may employ ten servers for New York City, for example, but not need as many for a large region such as Alaska.

To partition location servers, in one example, the service first divides the area of coverage into mini-regions, in which there are far more (e.g., 100 to 1000 times) more mini-regions than there are servers in the location server clusters at world scale. Each of these mini-regions is rectangular, and the aggregation of the mini-regions fully covers the entire region of interest without overlap. Initially, mini-regions are assigned uniformly to servers in the location server cluster.

As system load skew emerges, the service (e.g., the partition manager 250 of FIG. 2) takes individual mini-regions from the busier servers and assigns them to the less busy servers in the location server cluster by moving the data and updating the location partition map stored in the data store 138. Over time, the load tends to become uniformly distributed across the location server cluster. If there is a need to add servers to the cluster, the service provisions a new server and moves mini-regions to the new system from the servers in the cluster that are most busy, again by moving the data and then updating the location partition map in the data store 138. Similarly, if there is a need to remove servers due to contracting load driven by lighter usage, mini-partitions can be moved from one or more servers, with the location partition map in the data store 138 updated to reflect the new mini-partition locations. Unloaded servers may be removed from the location server cluster.

Note that this technique of making a mini-partition the unit of load distribution fully supports non-rectangular regions to be assigned to a given location server. For example, large open spaces may be served by a single server, whereas a busy highway may be handled by many servers.

Turning to a consideration of notes and selective delivery, notes or messages (e.g., accompanying metadata) can specify a time to deliver, whether the note is one time (then delete), ongoing (until deleted), recurring (as with meetings, daily, weekly, during particular time windows), and so forth. The note metadata can also specify one or more locations where it is to be delivered, which for example may be within X meters of known coordinates, or a logical location (e.g., eastbound Highway One, one-quarter mile west of exit 123.) The note metadata can also specify one or more target recipients, e.g., via individual identifiers, a subscriber list, and/or a community alias. Notes may also include matching context metadata, e.g., only when not late (have time to stop), only when the recipient is in a social event context (as opposed to a professional or personal context), and so forth.

Figure 5:
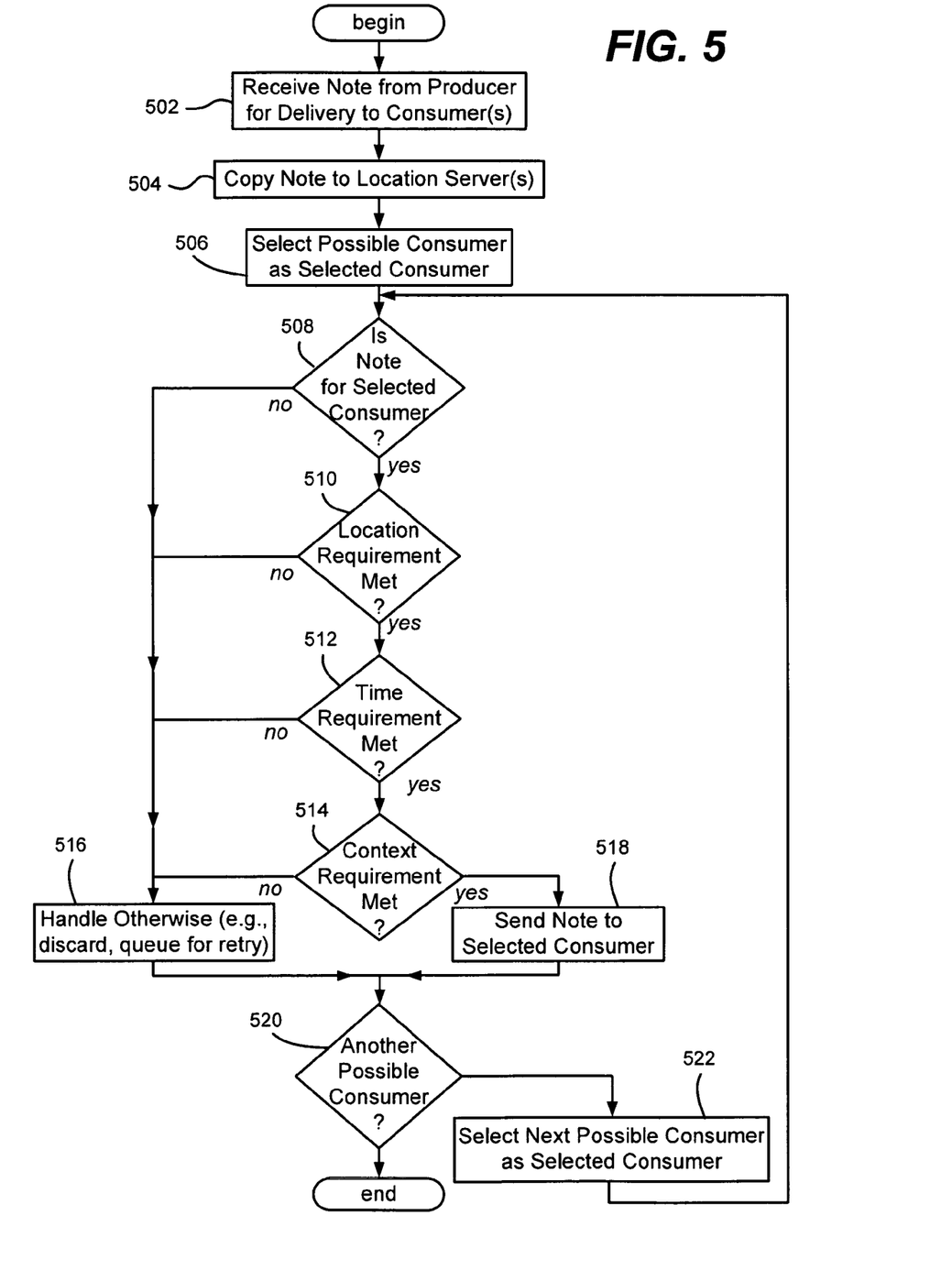
FIG. 5 is a flow diagram representing example service logic for evaluating a note that has become available for selective delivery to one or more clients.

FIGS. 2 and 5 show example concepts with respect selective delivery. In general, as represented in FIG. 2, a service 260 may have one or more notes 262 to deliver to the client 114, such as including notes 264 from producer or note producer, including from external sources such as other users, emergency alerts, and so forth, and/or notes 266 produced by the service (e.g., when a user's current location corresponds to a location of interest). In keeping with selective delivery concepts, some or all these notes 262 may be delivered, depending on the intended client consumer's current state data 270, as evaluated by a selection mechanism 272 against information (metadata) typically accompanying each note. For example, priority and sender information (e.g., high priority/family context) may be compared against the client's do not disturb context state (e.g., only high priority/family or work) to determine whether (as well as when and possibly how) to deliver a specific note.

FIG. 5 shows example steps that may be taken by such a selection mechanism 272 when determining whether to deliver a given note received from a producer to one or more targeted consumers, beginning at step 502 where a note becomes available (e.g., is received from a producer, a delivery-time criterion is met, or the like) for possible delivery. In general, notes will be delivered to clients if they meet the appropriate delivery criteria, when the note is available; the note will be sent by the user server if possible, otherwise (or in addition to) it will be sent by the location server when the user enters the appropriate corresponding location. Because users do not always change locations, the user server of each user also attempts delivery.

Step 504 represents copying the note to the one or more appropriate location servers. If the note is not deliverable now, it may be delivered when the user enters a location covered by a location server.

Step 506 selects a client as a possible consumer, and step 508 determines whether the note is intended for this given consumer, e.g., based upon client identification. For example, notes may be only for delivery to a specific group of consumers as identified by the note producer, and step 508 evaluates whether the note applies to this selected consumer. If not, the note is not delivered to that consumer, and another consumer is selected via steps 520 and 522 until none remain.

If the consumer meets the producer's intended consumer set, steps 510, 512 and 514 represent evaluating the state data of that selected consumer against metadata accompanying the note and other criteria, such as the current time. In this example, if any of the selected consumer's delivery location requirements, time requirements or context requirements are not met, the note is not delivered, as represented by step 516. The note may be discarded, queued for (e.g., periodic) retry until delivered or up to some number of attempts, and so forth. The location server or servers that apply to the note also may deliver the note, as described below with reference to FIG. 6.

If the note is for this consumer at step 508, and each of the selected user's delivery location requirements, time requirements and context requirements are met, the note is delivered at step 518. Steps 520 and 522 repeat the selective delivery process until possible delivery for all targeted consumers has been evaluated.

Figure 6:
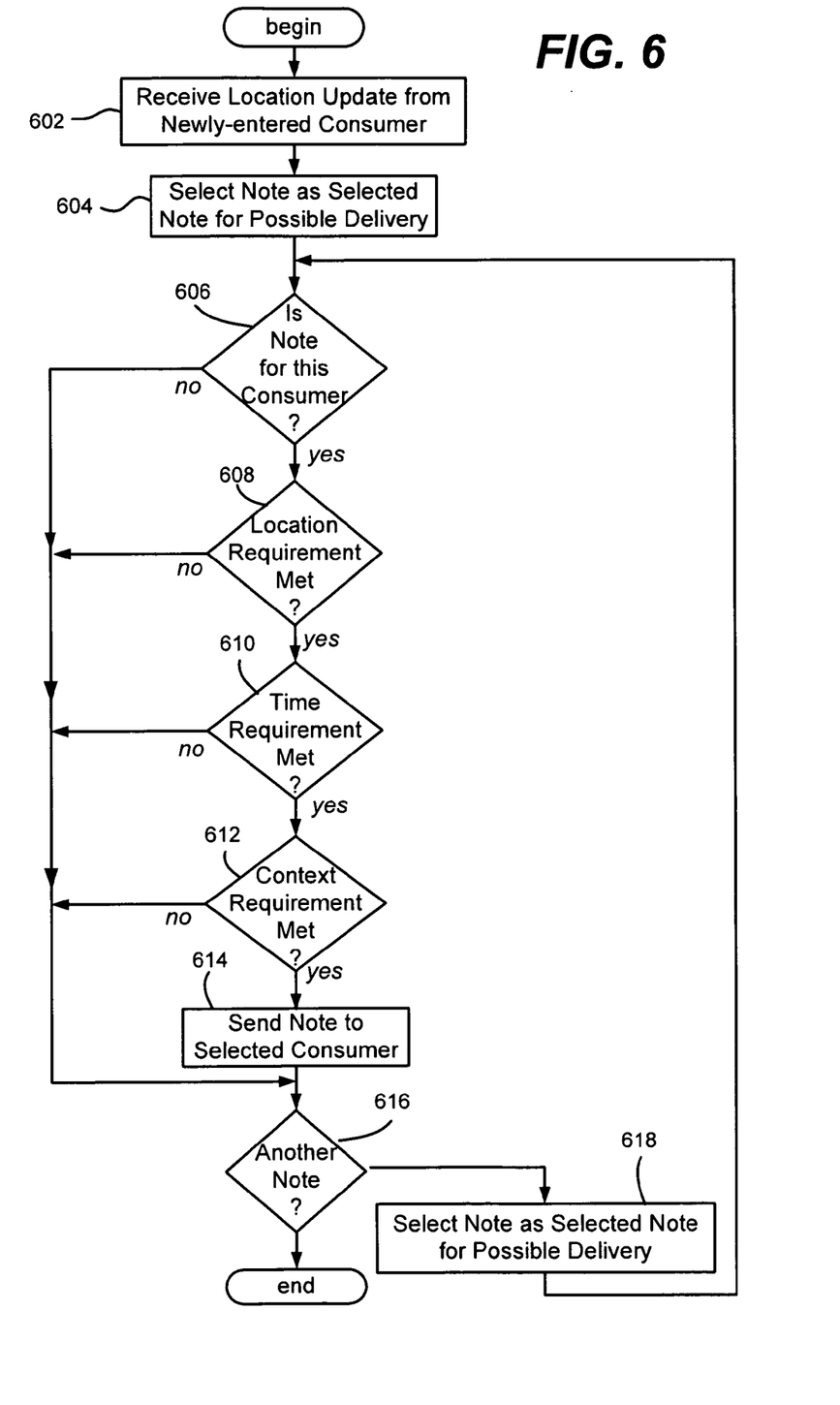
FIG. 6 is a flow diagram representing example service logic for evaluating notes for selective delivery to a client that has entered a new location.

FIG. 6 shows example steps that may be taken by a location server to deliver a note to a consumer. In general, each time a consumer enters a new location, that location's corresponding location server delivers any pending notes to that user that are held at that location server, subject to the user's other delivery criteria. Step 602 represents the user entering the new location, and step 604 represents selecting a pending note for evaluation against client identity (step 606), any location requirements (step 608), any time requirements (step 610) and any context requirements (step 612).

In this example, the selected note is delivered at step 614 only if all criteria are met. Steps 616 and 618 repeat the evaluation for the next note, and so forth, until no notes remain to be processed for possible delivery.

It should be noted that the example evaluations of whether to deliver a note to one or more consumers as exemplified in FIGS. 5 and 6 may be rearranged for efficiency, or otherwise configured. For example, a note that is only to be delivered to consumers in Alaska can evaluate location requirements first, before determining whether the note is for a given identity; a note that is to be delivered to every user need not check whether each user is an intended consumer, and so forth.

As can be readily appreciated, the service provides value in a variety of scenarios. For example, hazard alerts may post a message to alert drivers (such as those within a "community of trust" which may be a specific alias or contacts list) to a change in road conditions that would cause the recipients to want to slow down or be careful at a particular spot (e.g., ice on road, object in road, speed trap, and so forth). A virtual emergency fleet may be facilitated, e.g., emergency workers locations may be tracked to be more quickly dispatched to the scene of an accident based on their known location and on-call status, which may significantly reduce the response time.

Another example provides a guided tour, in which as landmarks are approached, the service triggers audio messages describing historical, natural, or cultural landmarks. Custom guided tours may comprise a sequence of notes that correspond to a specific navigation route that is downloaded. Personal notes may be automatically posted, e.g., a message to a specific family member to remind them of an event that happened in a location.

Help requests are another scenario, e.g., when experiencing car trouble a participating user can post a note to be read by those in their "community of trust" asking for help, a ride, and so forth, which can be directed to those known to be nearby or likely passing by. This also facilitates more flexible carpooling and ride sharing possibilities.

Relevant advertising may be delivered to any user who meets time, place and context criteria. This may include electronic coupons/notices of discounts as a user approaches a business, e.g., a restaurant at lunch time, an oil change facility when an oil change is due, a current price list from upcoming gasoline stations when the fuel tank is low, and so forth.

Thus, by tracking locations of authenticated users and each user's current context (e.g., in a car, a specified or predicted destination, a current task), delivery of a targeted note such as audio or an electronically displayed message may be selectively made to that user. Selectivity includes appropriate filtering, (e.g., identity, context, do not disturb/junk mail settings, and so forth).

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a networked communications environment, a system comprising:

at least one server comprising a service that tracks location and other state of client consumers, the at least one server comprising at least one physical machine;

a selection mechanism associated with the service, the selection mechanism configured to evaluate client-associated state data against metadata of a note generated by a note producer to determine whether to deliver the note to a given client consumer, the metadata comprising a priority level, wherein the selection mechanism evaluates the metadata against client-associated state data of the given client including a logical location based upon at least one of an historical location prediction or a statistical location prediction, wherein the selection mechanism evaluates the metadata against client location data, time and client context data, the client context data comprising user-specified state information associated a priority level of notes to be delivered to the client, wherein the service includes a plurality of location servers, each location server associated with a set of one or more location regions based on means for partitioning a full set of served location regions into subsets of location regions, and means for assigning one or more location regions to each location server such that locations of interest are associated with location state servers.

2. The system of claim 1 wherein the selection mechanism determines whether to deliver the note to the given client consumer based on client identity data of that given client, the client identity data including a user identifier or a device identifier, or a combination of a user identifier and a device identifier.

3. The system of claim 1 wherein the service includes a plurality of client state servers, each client state server associated with a set of one or more clients based on means for partitioning a full set of clients into subsets of client partitions, and means for assigning one or more client partitions to each client state server such that each client is associated with at least one client state server.

4. The system of claim 1 further comprising a partition manager that moves one or more client partitions between client state servers according to server loads.

5. The system of claim 1 wherein the service receives client state data from the given client consumer via the Internet and delivers the note to the client via an instant messaging system.

* * * * *